United States Patent [19]
Sato

[11] Patent Number: 5,881,322
[45] Date of Patent: Mar. 9, 1999

[54] ELECTRONIC DEVELOPMENT TYPE CAMERA

[75] Inventor: Koichi Sato, Tokyo, Japan

[73] Assignee: Asahi Kogaku Kogyo Kabushiki Kaisha, Tokyo, Japan

[21] Appl. No.: 564,577

[22] Filed: Nov. 29, 1995

[30] Foreign Application Priority Data

Nov. 29, 1994 [JP] Japan .................................. 6-319080

[51] Int. Cl.$^6$ .................................................. G03B 17/50
[52] U.S. Cl. ............................................................ 396/30
[58] Field of Search ............................. 396/30, 429, 273, 396/270, 284, 285, 389, 390, 392; 348/231, 233

[56] References Cited

U.S. PATENT DOCUMENTS

| | | | |
|---|---|---|---|
| 4,041,510 | 8/1977 | Kern | 354/217 |
| 4,878,075 | 10/1989 | Cannon | 354/173.1 |
| 4,887,161 | 12/1989 | Watanabe et al. | 358/224 |
| 5,091,787 | 2/1992 | Watanabe et al. | 358/209 |
| 5,159,458 | 10/1992 | Murata et al. | 358/229 |
| 5,315,410 | 5/1994 | Takanashi et al. | 358/471 |
| 5,424,156 | 6/1995 | Aoki et al. | 430/59 |
| 5,477,289 | 12/1995 | Smart | 354/106 |
| 5,521,661 | 5/1996 | Wakabayashi | 354/21 |
| 5,555,205 | 9/1996 | Okabe | 365/108 |
| 5,649,252 | 7/1997 | Takahashi et al. | 396/389 |
| 5,655,168 | 8/1997 | Ohtsuka | 396/390 |
| 5,671,455 | 9/1997 | Nagata et al. | 396/390 |

FOREIGN PATENT DOCUMENTS

| | | |
|---|---|---|
| 0327236 | 1/1989 | European Pat. Off. . |
| 229081 | 1/1990 | Japan . |
| 52280 | 1/1993 | Japan . |
| 5150251 | 6/1993 | Japan . |
| 6313894 | 11/1994 | Japan . |

OTHER PUBLICATIONS

English translation of Japanese Unexamined Patent Publication No. 6-313894.

*Primary Examiner*—Safet Metjahic
*Assistant Examiner*—John Chizmar
*Attorney, Agent, or Firm*—Greenblum & Bernstein, P.L.C.

[57] ABSTRACT

An electronic development type camera using an electronic development type recording medium, having an electrostatic data recording medium and an electric charge holding medium. The electronic development type camera includes a detector for detecting whether an image has been recorded on the recording medium loaded in the camera, a mode changing device for changing a mode between a photographing mode and an image reading mode, and an actuator for driving the mode changing device to select the photographing mode when the detector detects the absence of the recorded image on the recording medium loaded in the camera, and the image reading mode when the detector detects the presence of the recorded image on the recording medium loaded in the camera, respectively.

18 Claims, 16 Drawing Sheets

ELECTRONIC DEVELOPMENT TYPE CAMERA

BACKGROUND OF THE INVENTION

1. Field of the Invention

The present invention relates to a camera which includes a recording medium in which an image obtained during an exposure interval can be electronically developed.

2. Description of Related Art

There are many known photographic materials in which an optical image obtained during an exposure interval can be electronically developed. For example, in Japanese Unexamined Patent Publication No. 5-2280, a recording medium is disclosed which is comprised of an electrostatic data recording medium and an electric charge holding medium in combination. According to the above-noted document, the recording medium, which can be electronically developed, and a camera using the same are referred to as an electronic development type recording medium and an electronic development type camera, respectively.

In the electronic development type recording medium disclosed in JPP 5-2280, the electrostatic data recording medium is provided with a photoconductive layer and an inorganic oxide layer, and the charge holding medium is provided with a liquid crystal display element. In this arrangement, if the electrostatic data recording medium is exposed while a voltage is applied between the electrostatic data recording medium and the charge holding medium, electric charges, corresponding to the quantity of light to be incident thereupon, are produced. The intensity of an electric field to be applied to the liquid crystal display element, that is opposed to the electrostatic data recording medium, varies depending on the electric charges produced, and hence, an image corresponding to the distribution of the quantity of light is displayed in the liquid crystal display element. Namely, the image recorded on the electrostatic data recording medium, as a latent image, is immediately developed to be displayed in the liquid crystal as a visible image.

Preferably, a dispersive liquid crystal display element, as disclosed in Japanese Unexamined Patent Publication No. 5-150251, is used as the liquid crystal element for the electronic development type recording medium. In the dispersive liquid crystal display element, the visible image formed on the liquid crystal display element, by the application of the electric field thereto, can be held even after the electric field has been removed. Consequently, the electronic development type recording medium can be stored in much the same way as conventional slide films.

In the electronic development type recording medium disclosed in JPP 5-2280, the recorded image can be erased by initializing the orientation of the liquid crystal, and hence, the same electronic development type recording medium can be repeatedly used. In spite of this advantage, however, there is a possibility that an electronic development type recording medium which already has an image recorded on it (exposed), may be used to re-record a new image (re-exposure). If a re-exposure process is to take place, the intended new image cannot be obtained without the recorded image first being erased.

SUMMARY OF THE INVENTION

It is an object of the present invention to provide an electronic development type camera in which it is possible to prevent a recorded image from being accidentally erased due to a re-exposure.

Another object of the present invention is to provide an electronic development type camera whose operability is enhanced.

To achieve the object mentioned above, according to the present invention, there is provided an electronic development type camera using an electronic development type recording medium comprised of an electrostatic data recording medium and an electric charge holding medium. The camera comprises a holder which detachably holds the electronic development type recording medium; a sensor for detecting the electronic development type recording medium, when it is held by the holder; and, a device for judging whether or not an image has been recorded on the electronic development type recording medium when it is held by the holder. The electronic development type recording medium comprises a medium on which a visible image is formed, upon photographing, without any need for chemical treatment after exposure and includes a detecting area and a recording area. The judging device comprises a detector for detecting a transmittance of the detecting area; a device for evaluating whether or not the measurement of the transmittance is substantially identical to a predetermined reference value; and, an indicator for informing that an image has been recorded on the electronic development type recording medium, when the measurement of transmittance is not substantially identical to the reference value. The indicator can be an optical or an acoustic signalizing means.

The electronic development type camera also comprises a light emitter which emits a light toward the detecting area upon photographing.

Preferably, the evaluating device comprises a calculator for calculating a difference between the measurement of transmittance detected by the detector and the evaluating device and the reference value, and a comparator for comparing an absolute value of the difference obtained by the calculator with a predetermined error value.

When it is judged that an image has been recorded on the recording medium, a photographing prohibiting device prohibits photography.

The detector comprises a light transmission type photo sensor which is provided with a light emitter and a light receiver, located at opposite sides of the recording medium.

According to yet another aspect of the present invention, there is provided an electronic development type recording camera, using an electronic development type recording material comprised of an electrostatic data recording medium and an electric charge holding medium. The camera comprises an image reading device which reads the image recorded on the electronic development type recording medium; a detector for detecting whether or not an image has been recorded on the electronic development type recording medium, loaded in the electronic development type camera; a device for changing between a photographing mode, in which an image can be recorded on the electronic development type recording medium, and an image reading mode in which the image recorded on the electronic development type recording medium can be read therefrom by the image reading device; and, a selector for driving the mode changing device to select the photographing mode when the detector detects the absence of the recorded image on the electronic development type recording medium loaded in the electronic development type camera, and the image reading mode when the detector detects the presence of the recorded image on the electronic development type recording medium loaded in the electronic development type camera, respectively. The electronic development type recording medium comprises a medium on which a visible image is formed upon photographing without any need for chemical treatment after exposure.

The electronic development type camera further comprises an indicator for indicating the photographing mode, when, the photographing mode is selected by the selector, in accordance with the detection of the absence of the recorded image on the electronic development type recording medium loaded in the electronic development type camera. The indicator also indicates the image reading mode, when selected, in accordance with the detection of the presence of the recorded image on the electronic development type recording medium, loaded in the electronic development type camera. The indicator comprises a liquid crystal panel provided on a camera body of the electronic development type camera.

The electronic development type recording medium includes a detecting area and a recording area. The detector comprises a sensor for sensing the transmittance of the detecting area, and a comparator for comparing the measured transmittance thus obtained by the sensor with a predetermined reference value. When the measured transmittance is substantially identical to the reference value, it is judged that no image has been recorded, and when the measured transmittance is larger than the reference value by a predetermined value, it is judged that the image has been recorded, on the electronic development type recording medium, respectively.

The electronic development type camera preferably further comprises a calculator for calculating the difference between the measured transmittance and the reference value, so that an absolute value of the difference thus obtained is compared with a predetermined error value by the comparator.

A shutter is also included in the electronic development type camera. An activating voltage is applied to the electronic development type recording medium before the shutter is opened, in the photographing mode. The voltage supply is stopped when the shutter is closed. The voltage application time is selected, so that an image to be recorded on the electronic development type recording medium has the maximum contrast. A judging device judges whether or not the voltage has been applied to the electronic development type recording medium.

The electronic development type camera further comprises a light source, located closer to an object to be photographed relative to the shutter location. The light source emits light which is incident onto the electronic development type recording medium when the shutter is completely open in the image reading mode.

The present disclosure relates to subject matter contained in Japanese Patent Application No. 6-319080 (filed on Nov. 29, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
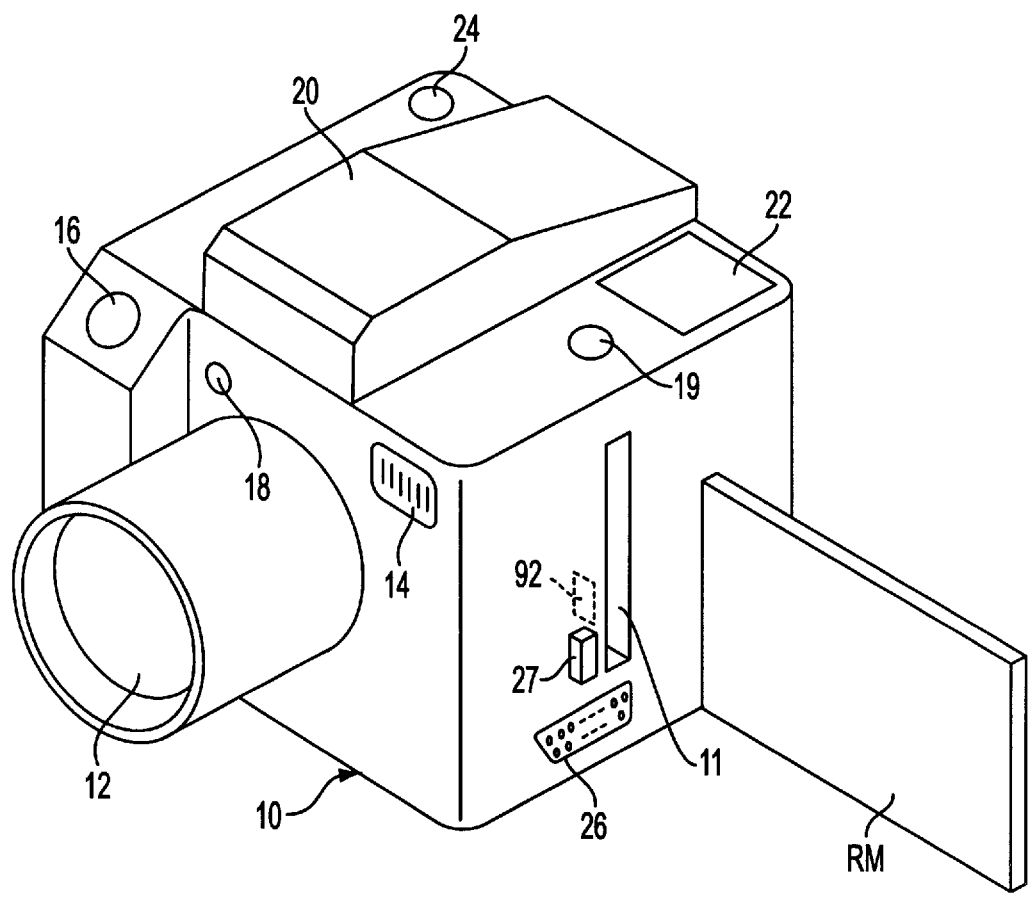
FIG. 1 is a perspective view of an electronic development type camera according to the present invention.

FIG. 1 shows an embodiment of a single lens reflex type still video camera according to the present invention.

In FIG. 1, an electronic development type recording medium RM can be inserted in an insertion slot 11, provided on a side surface of a camera body 10 of the electronic development type camera, in order to be positioned in a loaded position.

As viewed from the front of the camera body 10, there is a photographing optical system 12 having a photographing lens, etc., located, substantially in the central part of the camera body. A strobe 14 is provided above and to the right of the photographing optical system 12. A release switch 16 and a photometering sensor 18, are provided on the opposite side of the strobe 14, with respect to the photographing optical system 12. A finder 20 is provided on the central portion of the upper surface of the camera body 10. The camera body 10 is provided on one side of the finder 20 with a scan start switch 19 and a liquid crystal display panel 22 and on the other side of the finder 20 with a main switch 24, respectively. The camera body 10 is provided, on the lower portion of the side surface thereof, with an output terminal 26. An ejection switch 27 is provided which is depressed to eject the electronic development type recording medium RM, inserted in the slot 11, therefrom.

Figure 2:
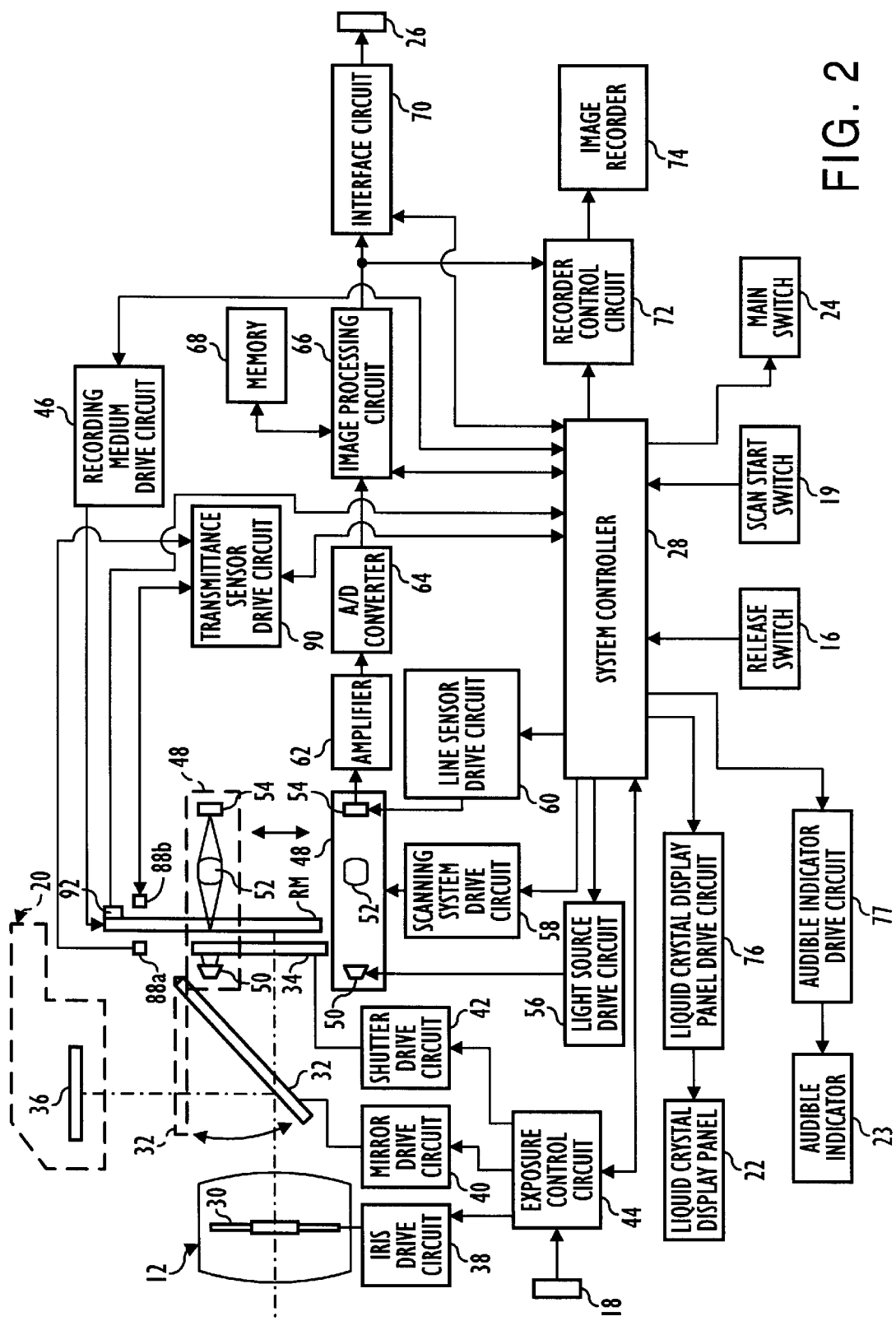
FIG. 2 is a block diagram of an electronic development type camera, according to a first embodiment of the present invention.

FIG. 2 shows a block diagram of a first embodiment of an electronic development type camera according to the present invention. In FIG. 2, a system control circuit (system controller) 28 is comprised of a microcomputer which, in general, controls the electronic development type camera.

The photographing optical system 12 includes a diaphragm 30, in addition to the lens groups. The electronic development type recording medium RM is located behind the photographing optical system 12. A quick return mirror 32 is provided between the photographing optical system 12 and the electronic development type recording medium RM. A shutter 34 is provided between the quick return mirror 32 and the electronic development type recording medium RM. A focusing plate 36, of a finder optical system, is provided in the finder 20, above the quick return mirror 32.

The diaphragm 30, the quick return mirror 32 and the shutter 34 are driven by an iris drive circuit 38, a mirror drive circuit 40 and a shutter drive circuit 42, respectively. These drive circuits 38, 40 and 42 are controlled by an exposure control circuit 44. The exposure control circuit 44 operates in response to a command signal supplied from the system controller 28. Namely, to control exposure, the opening angle of the diaphragm 30 is controlled by the iris drive circuit 38, in accordance with control of the exposure control circuit 44 in response to an output signal from a photometering sensor 18. The quick return mirror 32 is normally located in a lower position (inclined position indicated by the solid line), in which light transmitted through the photographing optical system 12 reaches the finder optical system of the finder 20 so that an object image can be viewed. Upon taking a picture, the quick return mirror 32 is rotated to an upper position (horizontal position indicated by the dotted line) by the mirror drive circuit 40. The shutter 34 opens or closes at a position in the optical path of the electronic development type recording medium RM. Namely, upon photographing, the shutter 34, which is normally closed, opens for a predetermined time in accordance with control commands from the exposure control circuit 44, so that light transmitted through the photographing optical system 12 can be made incident upon the light receiving surface of the electronic development type recording medium RM. In other words, when the quick return mirror 32 is moved to the upper position (horizontal position) and the shutter 34 is opened, the object image is formed on the light receiving surface of the electronic development type recording medium RM, through the photographing optical system 12.

A voltage is applied to the electronic development type recording medium RM in accordance with control commands from the recording medium drive circuit 46, which operates in accordance with command signals supplied from the system controller 28. If the light receiving surface is exposed while the voltage is applied to the electronic development type recording medium RM, a developed object image is produced thereon.

An image reading mechanism 48 is provided in the vicinity of the electronic development type recording medium RM to read recorded images as image signals from the electronic development type recording medium RM. The image reading mechanism 48 includes a light source 50, a scanning optical system 52 and a line sensor 54, and moves in a sub-scanning direction, which is normal to the longitudinal direction of the line sensor 54, along the electronic development type recording medium RM. Namely, in FIG. 2, the image reading mechanism 48 moves between a position indicated by the solid line and a position indicated by the dotted line. The light source 50 is comprised of, for example, LED's arrayed in a direction parallel to the longitudinal direction of the line sensor, and a collimating lens array which collimates a light flux emitted from the LED's. The light source 50 is provided on the front side of the shutter 34, i.e. on the front side of the electronic development type recording medium RM. The scanning optical system 52 and the line sensor 54 are provided on the rear side of the electronic development type recording medium RM. The line sensor 54 is comprised of a one-dimensional CCD sensor having, for example, 2,000 pixels. When the image reading mechanism 48 is moved in the sub-scanning direction along the electronic development type recording medium RM, the shutter 34 is open, and the light source 50 is turned ON. Consequently, the electronic development type recording medium RM is successively illuminated by the light emitted from the light source 50 in the sub-scanning direction. The illuminating light made incident upon the electronic development type recording medium RM is transmitted therethrough in accordance with the photographic density of the image recorded thereon. The light transmitted through the electronic development type recording medium RM is converged onto a light receiving element of the line sensor 54, through the scanning optical system 52.

The ON/OFF control of the light source 50 is carried out by a light source drive circuit 56. The movement of the image reading mechanism 48 is controlled by the scanning system drive circuit 58. The drive circuits 56 and 58 are controlled by the system controller 28.

The image signals are successively read from the line sensor 54 by the line sensor drive circuit 60 in accordance with control by the system controller 28, during the reading operation by the image reading mechanism 48. The image signals thus read are amplified by an amplifier 62 and are converted into digital image signals by an A/D converter 64. The digital image signals are subject to several image processes, such as, a shading correction, and a gamma correction, etc., in an image processing circuit 66, in accordance with control commands from the system controller 28, and are thereafter temporarily stored in a memory 68. The memory 68 has a necessary storage capacity to store the image signals, output from the line sensor 54, corresponding to one horizontal scan, or a frame memory which can store the image signals corresponding to one frame. The memory 68 can be provided with an E2PROM in which values corrected by the shading correction, etc., can be stored.

The image signals stored in the memory 68 are read therefrom by the image processing circuit 66, and then input to an interface circuit 70 where they are subjected to a format conversion, etc., before being sent to an external monitoring device (not shown), etc., through the output terminal 26. Moreover, the image signals output from the image processing circuit 66 are compressed or subjected to a format conversion, etc., by a recorder control circuit 72. Thereafter, the image signals can be recorded on a recording medium, such as an IC memory card or a floppy disc, by an image recorder 74. The interface circuit 70 and the recorder control circuit 72 are actuated in accordance with command signals supplied by the system controller 28.

As can be seen in FIG. 2, a liquid crystal display panel 22, connected to the system controller 28 through a liquid crystal display panel drive circuit 76, can be used to indicate various data or information needed by a photographer in connection with the photographing operation. Alternatively, information can be conveyed to the photographer by an audible indicator (e.g. alarm) 23 connected to the system controller 28 through an audible indicator (e.g. alarm) drive circuit 77.

Furthermore, the release switch 16, the scan start switch 19 and the main switch 24, etc., are connected to the system controller 28. The photographing operation is carried out by an operation of the release switch 16, so that the object image is recorded on the electronic development type recording medium RM as a visible image. The image reading mechanism 48 is actuated by the operation of the scan start switch 19 to read the image signals from the electronic development type recording medium RM. The ON/OFF control of the main power source of the electronic development camera is effected by the main switch 24.

Figure 3:
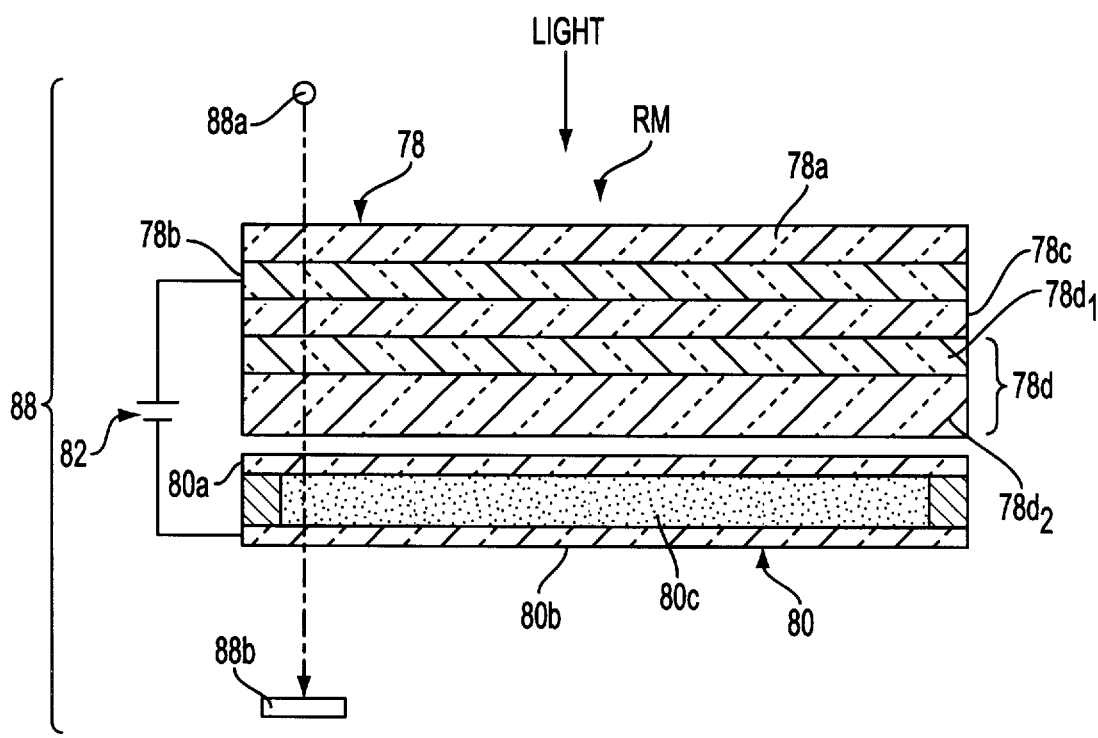
FIG. 3 is a schematic sectional view of an electronic development type recording medium, according to the first embodiment of the present invention.

Referring to FIG. 3, the electronic development type recording medium RM is comprised of an electrostatic data recording medium 78 and an electric charge holding medium 80. The electrostatic data recording medium 78 has a laminated structure consisting of a substrate 78a, an electrode layer 78b, an inorganic oxide layer 78c, and a photoconductive layer 78d. The photoconductive layer 78d is made up of an electric charge generating layer 78d, and an electric charge carrying layer 78d. The electrostatic data recording medium 78 is optically transparent as a whole. The charge holding medium 80 is comprised of a liquid crystal display element having a transparent support 80a, a transparent electrode plate 80b and a liquid crystal 80c enclosed therebetween. The electric charge carrying layer 78d, of the electrostatic data recording medium 78 is opposed to the liquid crystal support 80a of the charge holding medium 80 with a slight gap therebetween. A predetermined value of voltage is applied from the power source 82 between the electrostatic data recording medium 78 and the charge holding medium 80, as shown in FIG. 3. The power source 82 itself does not constitute a part of the electronic development type recording medium RM, but instead constitutes a part of the recording medium drive circuit 46 (FIG. 2).

Power supplied to the electronic development type recording medium RM is controlled by the recording medium drive circuit 46, so that when power is supplied, a predetermined voltage is applied between the electrode layer 78b of the electrostatic data recording medium 78 and the transparent electrode plate 80b of the charge holding medium 80. In this state, if the electrostatic data recording medium RM is exposed, the electric charge distribution corresponding to the contrast of the object images is produced in the electrostatic data recording medium 78. Consequently, the electric field, whose intensity corresponds to the charge distribution, acts on the liquid crystal 80c of the charge holding medium 80. Hence, a developed object image is indicated in the liquid crystal element (charge holding medium). Thus, the electronic image obtained by the electrostatic data recording medium 78 is immediately developed by the liquid crystal display element 80. If the charge holding medium 80 is made of a dispersive liquid crystal display element or a memory-type liquid crystal display element, the recorded visible image can be maintained even after the electric field has been removed.

Figure 4:
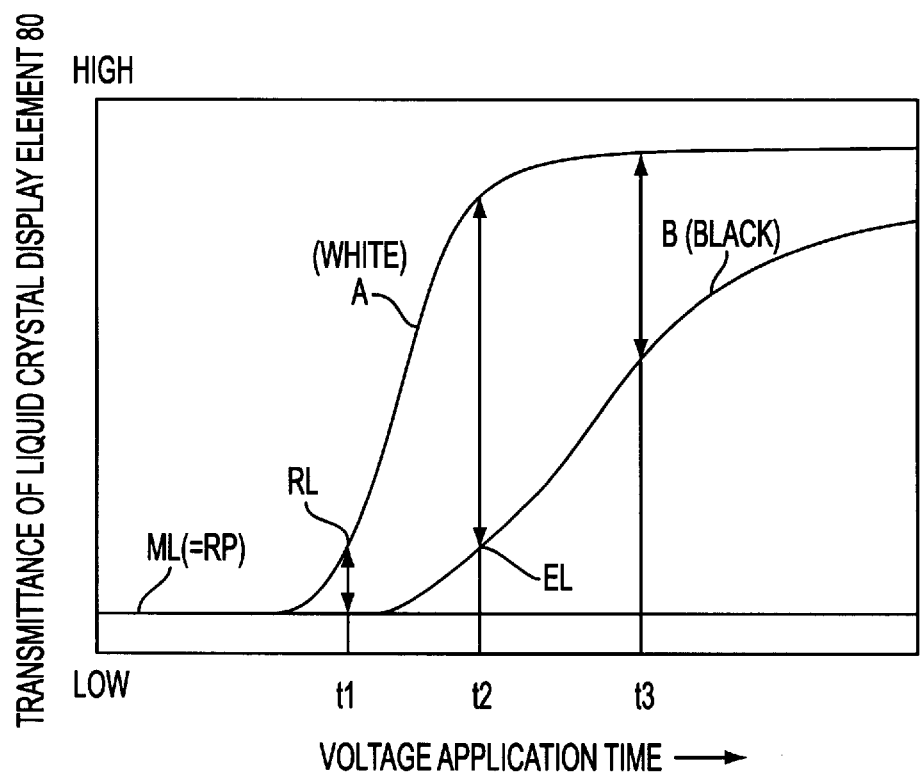
FIG. 4 is a graph showing transmittance characteristics of a charge holding medium (liquid crystal display element) of an electronic development type recording medium.

FIG. 4 shows a graph which represents the transmittance characteristics of a light portion and a dark portion of the electrostatic data recording medium 78, produced when an image of a pattern (chart) consisting of a white area and a black area is formed on the electrostatic data recording medium. In FIG. 4, the curves "A" and "B" represent the transmittance of the light portion (white area) and the dark portion (black area) in connection with the voltage application time, respectively. When the chart image is formed on the light receiving surface of the electrostatic data recording medium 78, while a predetermined voltage is applied between the electrode layer 78b of the electrostatic data recording medium 78 and the transparent electrode plate 80b of the charge holding medium 80, electric resistance of the photoconductive layer 78d in the light portion corresponding to the white area, is greatly decreased; and, electric resistance of the photoconductive layer 78d in the dark portion corresponding to the black area (i.e., light intercepting portion that has not been exposed), is slightly decreased. Thus, the transmittance of the liquid crystal display element 80 at the light portion and at the dark portion varies as indicated by the curves "A" and "B" shown in FIG. 4, respectively. The transmittance of the liquid crystal display element 80 increases as the voltage to be applied thereto increases.

The difference in transmittance between the light portion and the dark portion represents the contrast of the image recorded in the liquid crystal display element 80. In order to obtain a clear image having maximum contrast, it is necessary to stop the application of the voltage by the power source 82 at a time t2 shown in FIG. 4. If the voltage supply is stopped at a time earlier than the time t2 (e.g. time t1), the image produced would have a lack of contrast and be unclear. Conversely, if the voltage supply is stopped at a time later than time t2 (e.g. time t3), the difference in transmittance between the light portion and the dark portion becomes small. Namely, the contrast of the image obtained at a voltage application time t3 is about one-half of that obtained at the voltage application time t2.

As can be seen from the foregoing, once the image is recorded on the electronic development type recording medium RM, and more precisely, when the activating voltage is applied through the power source 82, the transmittance of the liquid crystal display element 80 varies even in the dark portion (i.e. light intercepting portion that has not been exposed). Since the transmittance is held even after the voltage is removed, whether or not images have been recorded in the electronic development type recording medium RM loaded in the electronic development type camera, can be detected by detecting the change in the transmittance of the liquid crystal display element 80.

According to a first embodiment of the present invention, a transmittance sensor 88 is provided in the camera body 10 (see, FIGS. 2 and 3). The transmittance sensor comprises a light emitter 88a and a light receiver 88b which are located at opposite sides of a detecting area (i.e., an inspection area) of the recording medium RM. The detecting area is provided, for example, at a margin area of the recording medium RM, which is separate from the recording area of the recording medium RM. However, theoretically, the detecting area can be comprised of any portion of the liquid crystal layer 80c to which an activating voltage is applied upon photographing. In the transmittance sensor 88, light emitted from the light emitter 88a is made incident upon the recording medium RM, and passes through the transparent electrostatic data recording medium and the liquid crystal display element 80, to be thereby received by the light receiver 88b of the transmittance sensor 80. The light receiver 88b issues an output signal corresponding to the intensity of the light received.

Referring again to FIG. 2, the transmittance sensor 88 is connected to the system controller 28 through a transmittance sensor drive circuit 90, so that the emission of the light from the light emitter 88a of the transmittance sensor 88 is controlled by the transmittance sensor drive circuit 90, in accordance with command signals output from the system controller 28. The system controller 28 receives the signal output from the light receiver of the transmittance sensor 88 as measured transmittance data through the transmittance sensor drive circuit 90.

A recording medium detecting sensor 92 (FIGS. 1 and 2) is provided in the insertion slot 11 of the camera body 10 to detect the presence of the electronic development type recording medium RM when inserted in the slot 11. The recording medium detecting sensor 92 is comprised of a contact switch which is turned ON and OFF when the electronic development type recording medium RM is loaded and unloaded, respectively. As can be seen in FIG. 2, the ON/OFF signal from the contact switch of the recording medium detecting sensor 92 is sent to the system controller 28. It goes without saying that the recording medium detecting sensor 92 can be comprised of a sensor other than the contact switch, for example, by an optical sensor.

The operation of the electronic development type camera shown in FIGS. 1 through 3 will now be discussed below with reference to FIGS. 5 and 6.

Figure 5:
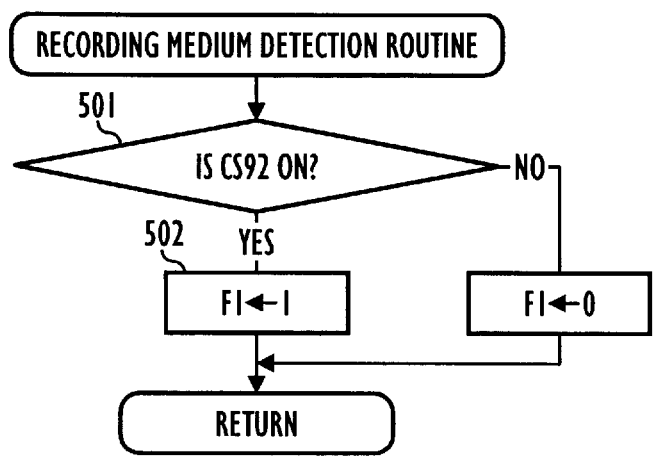
FIG. 5 is a flow chart showing a recording medium detection routine to detect the presence or absence of an electronic development type recording medium in an electronic development type camera, according to the present invention.

FIG. 5 shows a flow chart of the recording medium detecting routine to detect whether or not the electronic development type recording medium RM is loaded in the electronic development type camera. The recording medium detecting routine is periodically carried out at an interval of 10 ms, for example. This routine begins when the main switch 24 is turned ON. FIG. 6 shows a flow chart of the main routine of the electronic development type camera, which is commenced when the main switch 24 is turned ON.

Referring to FIG. 5, at step 501, it is determined whether the contact switch (CS) 92 is turned ON or OFF. Namely, at step 501, whether the electronic development type recording medium RM has been loaded in the electronic development type camera is detected. When the electronic development type recording medium RM has been loaded, the contact switch 92 is in the ON position and control proceeds to step 502 at which the recording medium detection flag F1 is set "1". Conversely, if the contact switch 92 is in the OFF position, i.e. no recording medium RM is loaded, control proceeds to step 503 at which the recording medium detection flag F1 is set "0". At this time, the recording medium detecting routine is completed, only to be repeated again every 10 ms.

Figure 6:
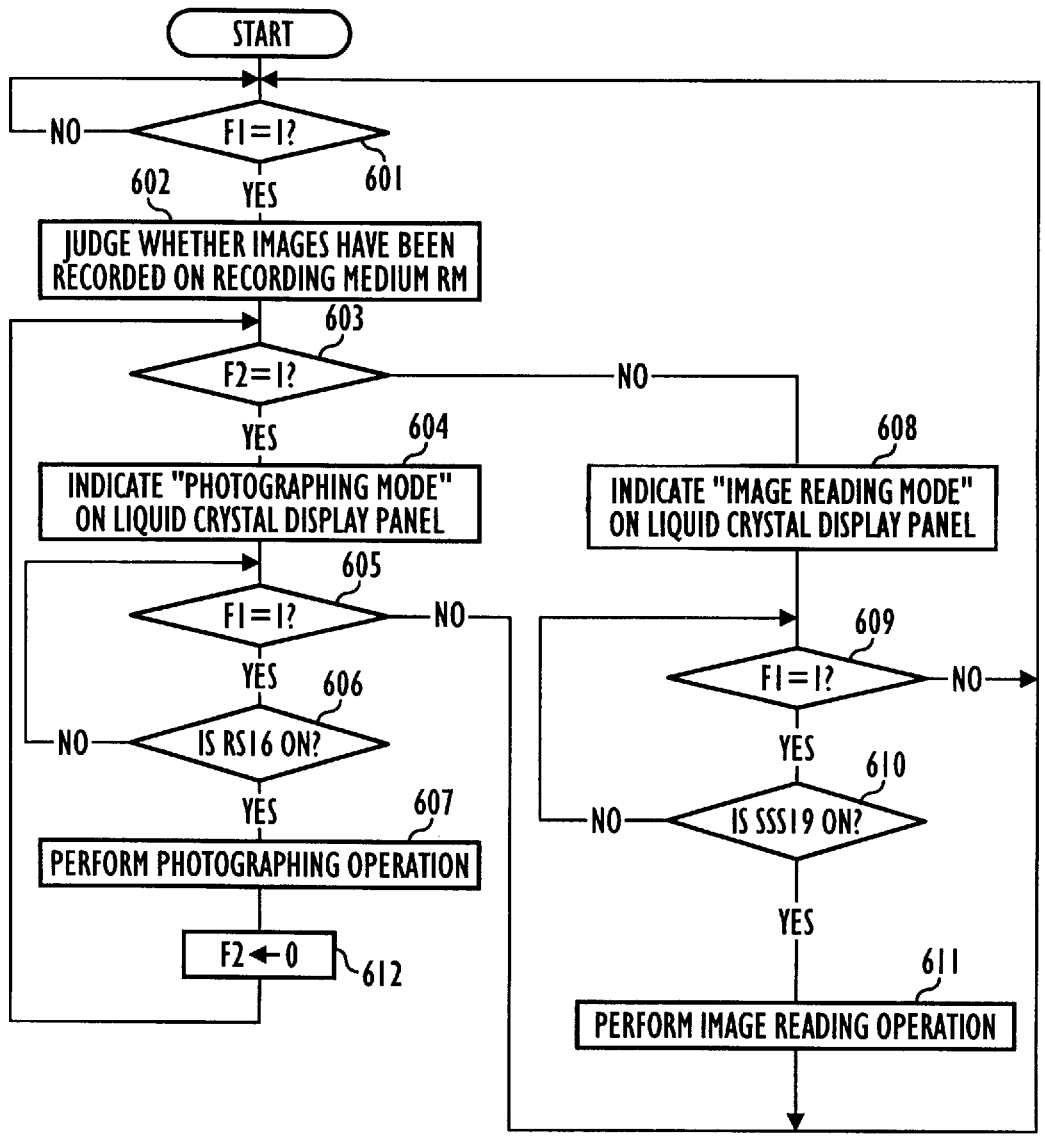
FIG. 6 is a flow chart showing a main routine, to explain the operation of an electronic development type camera, according to the present invention.

Looking at FIG. 6, whether the recording medium detection flag F1 is "1" or "0" is checked at step 601. Namely, whether or not the electronic development type recording medium RM is loaded in the electronic development type camera is checked. If no electronic development type recording medium RM is loaded, control does not proceed.

If F1=1 at step 601, i.e. the electronic development type recording medium RM is loaded, control proceeds to step 602 to check whether or not images have been recorded on the electronic development type recording medium RM. If no images have been recorded on the electronic development type recording medium RM, the recording medium judgement flag F2 is set "1", and if images have been recorded on the electronic development type recording medium RM, the recording medium judgement flag F2 is set "0", respectively. The detection of the recording of images on the electronic development type recording medium RM will be discussed later with reference to FIG. 7.

At step 603, whether the recording medium judgement flag F2 is "1" or "0" is checked. If F2=1, i.e. no images have been recorded on the electronic development type recording medium RM, control proceeds to step 604 to indicate a message, such as, "photographic mode" on the liquid crystal display panel 22. Thus, a user can learn through the message that the electronic development type camera is in the photographic mode. If it is deemed that this step, step 604, is superfluous to requirements, it could be omitted from the procedure. At step 605, whether the recording medium detection flag F1 is "1" or "0" is checked. If F1=1, i.e. the first electronic development type recording medium RM, on which no images have been recorded, is loaded, control proceeds to step 606 to check whether the release switch (RS) 16 is turned ON or OFF. If the release switch 16 is OFF, control is returned to step 605. Namely, at steps 605 and 606, it is assumed that upon reading the images recorded on the electronic development type recording medium RM, a user has inserted the wrong electronic development type recording medium RM in which no image is recorded in the slot of the camera, by mistake. Under this assumption, if the user ejects the wrong recording medium from the slot of the camera, the flag F1 becomes "0", so that control is returned from 605 to 601. Consequently, the routine prepares for the loading of another electronic development type recording medium RM.

If the user directs the electronic development type camera toward an object to be photographed and actuates the release switch 16 while the routine comprising steps 605 and 606 is being repeated, control proceeds to step 607 to perform a series of photographing operations to thereby record the object image in the electronic development type recording medium RM. The photographing operations will be discussed later, referring to FIGS. 8 and 9.

If F2=0 at step 603, i.e. an image has been recorded on the electronic development type recording medium RM, control proceeds to step 608 to indicate a message, such as, "image reading mode" on the liquid crystal display panel 22. Thus, the user can learn through the message that the electronic development type camera is in the image reading mode. In addition, as an alternative, it is prefered that provision is made to prohibit a photographing when F2=0 at step 603. The prohibition includes a system which ignores an operation of the release switch 16 when F2=0.

At step 609, whether the recording medium detection flag F1 is "1" or "0" is checked. If F1=1, i.e. the first electronic development type recording medium RM on which images have been recorded is loaded in the camera, control proceeds to step 610 to check whether the scan start switch (SSS) 19 is turned ON or OFF. If the SSS 19 is OFF, control is returned to step 609. Namely, at steps 609 and 610, it is assumed that upon recording the images in the electronic development type recording medium RM in which no images have been recorded, a user has mistakenly inserted a wrong electronic development type recording medium RM in which the images have been recorded in the slot of the camera. By this assumption, if the user ejects the wrong recording medium from the slot of the camera, the flag F1 becomes "0", so that control is returned from 609 to 601. Consequently, the routine prepares for the loading of a subsequent electronic development type recording medium RM.

If the user actuates the SSS 19 while the routine comprising steps 609 and 610 is being repeated, the control proceeds to step 611 from step 610 to perform a series of image reading operations to read the images recorded on the electronic development type recording medium RM therefrom. The image reading operations will be discussed later, referring to FIGS. 10 and 11.

If the photographing operations are completed at step 607, control proceeds to step 612 to set the flag F2 from "1" into "0", and then, control is returned to step 603. Consequently, control proceeds to step 608 from step 603 at which F2=0, so that the indicator of the liquid crystal display panel 22 is changed from "photographic mode" to "image reading mode". Thus, the user can learn through the indicator that the electronic development type camera is in the image reading mode.

At step 609, whether the recording medium detection flag F1 is "1" or "0" is checked. If F1=1, i.e. the first electronic development type recording medium RM on which images have been recorded is loaded, control proceeds to step 610 to check whether the scan start switch (SSS) 19 is turned ON. In short, upon reading the images recorded on the electronic development type recording medium RM subsequent to the recording of the images thereon, the scan start switch 19 is turned ON, so that the image reading operations are performed at step 611 to read the recorded images. However, if the user unloads the electronic development type recording medium RM from the electronic development type camera without reading the images recorded therein, control is returned to step 601 from step 609. Consequently, the main routine prepares for the loading of a subsequent electronic development type recording medium RM.

Figure 7:
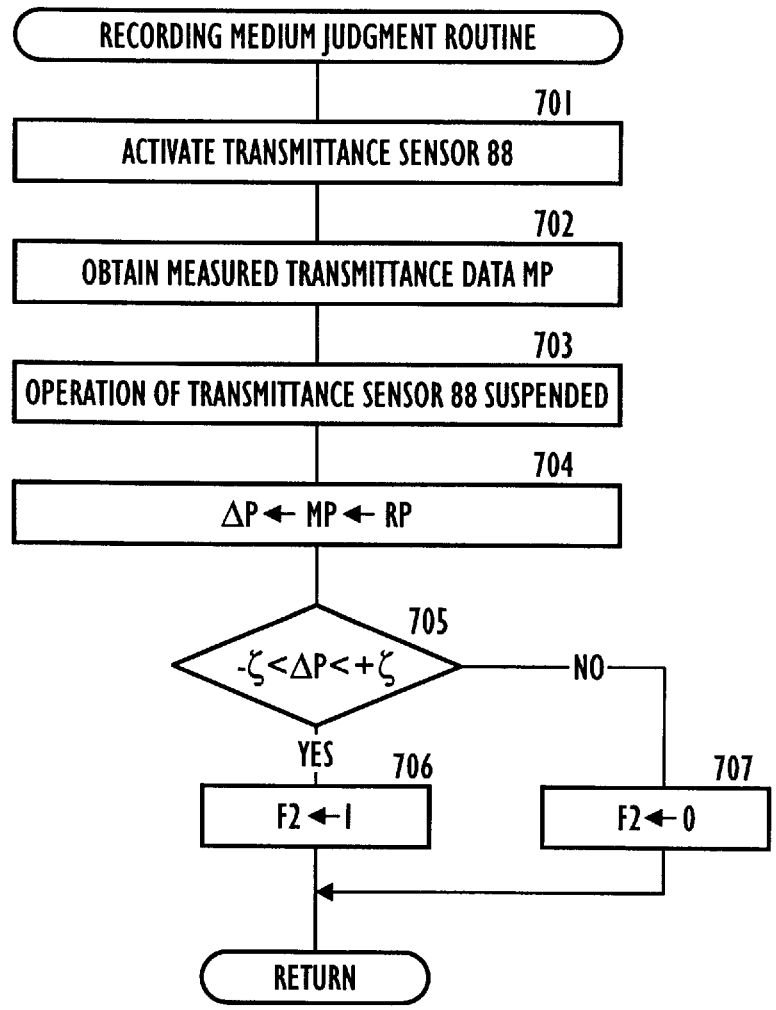
FIG. 7 is a flow chart showing a determination routine which is a part of the main routine shown in FIG. 6, to judge whether or not data has been recorded on a recording medium.

FIG. 7 shows a judgement routine to judge the electronic development type recording medium at step 602. At step 701, the transmittance sensor 88 is driven by the transmittance sensor drive circuit 90, so that light is emitted from the light emitter 88a of the transmittance sensor 88 toward the recording medium RM. The light passes through the electrostatic data recording medium 78, which is transparent, and the liquid crystal display element 80 and reaches the light receiver 88b of the transmittance sensor 88. Consequently, the light receiver 88b generates an output signal corresponding to the intensity of the light received. The intensity of the light emitted from the light emitter 88a of the transmittance sensor 88 is reduced when it passes through the liquid crystal display element 80 and hence, the output signals possess transmittance data corresponding to the portion of the liquid crystal 80 through which the light has passed.

At step 702, the signal output from the light receiver 88b of the transmittance sensor 88 is sent to the system controller 28 and processed therein to produce measured transmittance data MP. The operation of the transmittance sensor 88 is suspended at step 703.

At step 704, a difference ΔP between the measured transmittance data (measurement data) MP and the reference transmittance data RP is obtained through calculation. The reference transmittance RP is stored in a ROM of the system controller 28 and is identical, for example, to a minimum level (minimum transmittance) indicated at ML in FIG. 4. Assuming that the electronic development type recording medium RM to be detected is one in which no images have been recorded on it, the measurement data MP must be substantially equal to the minimum level (reference transmittance data) ML. Consequently, the difference ΔP (absolute value) between the measured transmittance data MP and the reference transmittance data RP must be within a tolerance (δ). If the electronic development type recording medium RM to be detected is one in which images have been recorded on it, the difference ΔP (absolute value) between the measured transmittance data MP and the reference transmittance data RP must be above the tolerance (δ), as indicated, for example, at EL in FIG. 4.

If the difference ΔP is within the tolerance (δ) at step 705, namely, the detected electronic development type recording medium RM has no images recorded on it, control proceeds to step 706 where the judgement flag F2 is set "1". Thereafter, control is returned to step 603 (FIG. 6). If the difference ΔP is considerably larger than the tolerance (δ) at step 705, namely, the detected electronic development type recording medium RM has images recorded on it, control proceeds to step 707 where the judgement flag F2 is set "0". Thereafter, control is returned to step 603 (FIG. 6). If the flag F2 is "0", it is possible to indicate a message of, for example, "error" on the liquid crystal display element, so that the operator can learn that the detected electronic development type recording medium has images recorded on it.

Figure 8:
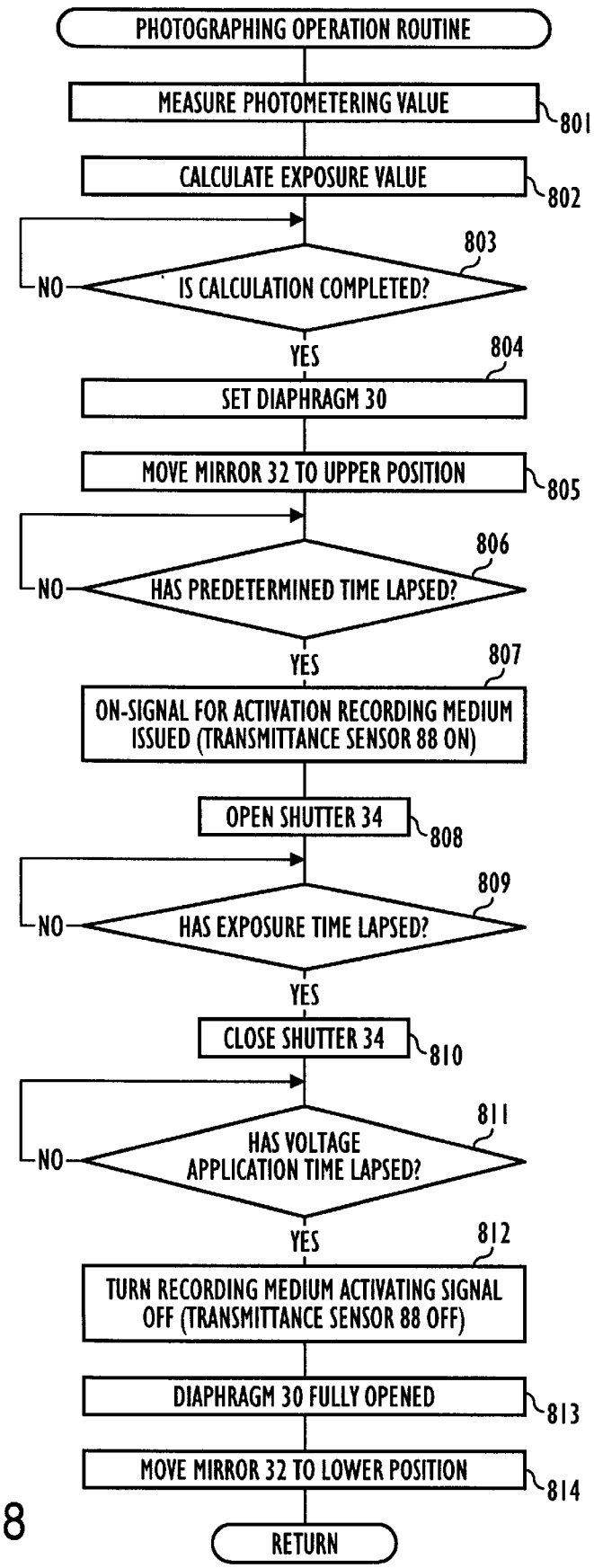
FIG. 8 is a flow chart showing a photographing operation routine which is a part of the main routine shown in FIG. 6.
Figure 9:
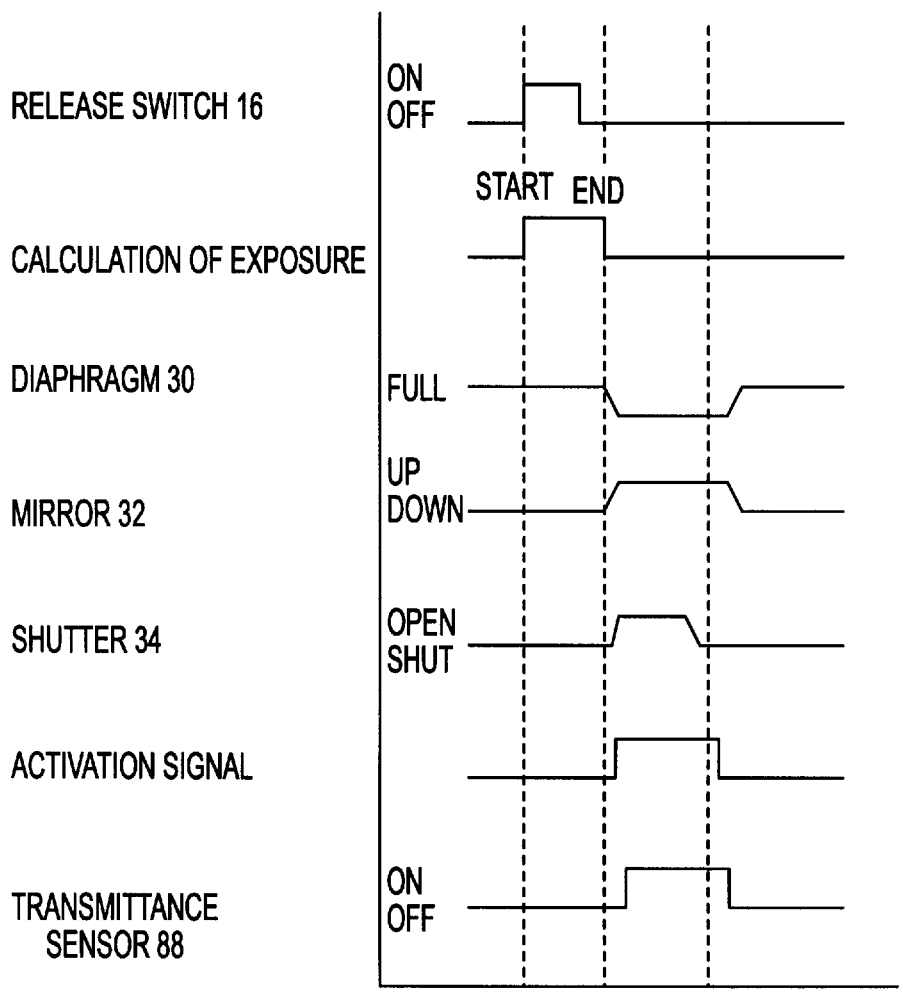
FIG. 9 is a time chart related to the photographing operation routine shown in FIG. 8.

FIG. 8 shows a routine for the photographing operations shown at step 607 in FIG. 6, and FIG. 9 shows a time chart of the photographing operations.

In FIG. 6, if the operator actuates the release switch 16 while the routine comprising steps 605 and 606 is being repeated, an ON signal is issued from the release switch 16 (FIG. 9). If the ON signal is issued from the release switch 16, control proceeds to step 801 from step 606 to bring photometering data from the photometering sensor 18 into the system controller 28. Thereafter, exposure is calculated at step 802 in accordance with the photometering data (FIG. 9).

At step 803, whether or not the calculation to obtain the exposure is finished is checked. If the calculation is finished, control proceeds to step 804 to decrease the size of the opening of the diaphragm 30, which is in a fully open position at a predetermined opening angle, in accordance with the result of the calculation, Thereafter, the quick return mirror 32 is moved from the lower position to the upper position at step 805. Whether a predetermined time has lapsed is checked at step 806. The predetermined time is identical to the time in which the diaphragm 30 is moved from the fully open position to the set opening angle and the time in which the quick return mirror 32 is moved from the lower position to the upper position.

If the predetermined time lapses at step 806, control proceeds to step 807 at which the recording medium activating signal is issued from the recording medium drive circuit 46 (FIG. 9), so that a predetermined value of voltage is applied between the electrostatic data recording medium 78 and the charge holding medium (liquid crystal display element) 80. Thereafter, at step 808, the shutter 34 is opened (FIG. 9), and the electronic development type recording medium RM, on which no images have been recorded, is exposed, so that the object images are recorded on the electronic development type recording medium RM through the photographing optical system 12. Consequently, the developed images are formed on the charge holding medium and the liquid crystal display element 80. At step 809, whether or not the optimum exposure time for the electronic development type recording medium RM has lapsed is checked. The optimum exposure time is determined in accordance with the result of the calculation mentioned above. If the exposure time has lapsed at step 809, control proceeds to step 810 to close the shutter 34. Thereafter, whether or not an optimum voltage application time for the electronic development type recording medium RM has lapsed is checked at step 811. If the voltage application time has lapsed, the issuance of the recording medium activating signal, which has been supplied to the electronic development type recording medium RM from the recording medium drive circuit 46, is stopped at step 812. As mentioned above with reference to FIG. 4, it is possible to record the object image in the electronic development type recording medium RM at the maximum contrast by appropriately setting the voltage application time.

Thereafter, the diaphragm 30 is fully opened again at step 813, and the quick return mirror 32 is moved from the upper position to the lower position at step 814. After that, control is returned to step 612 in FIG. 6.

Figure 10:
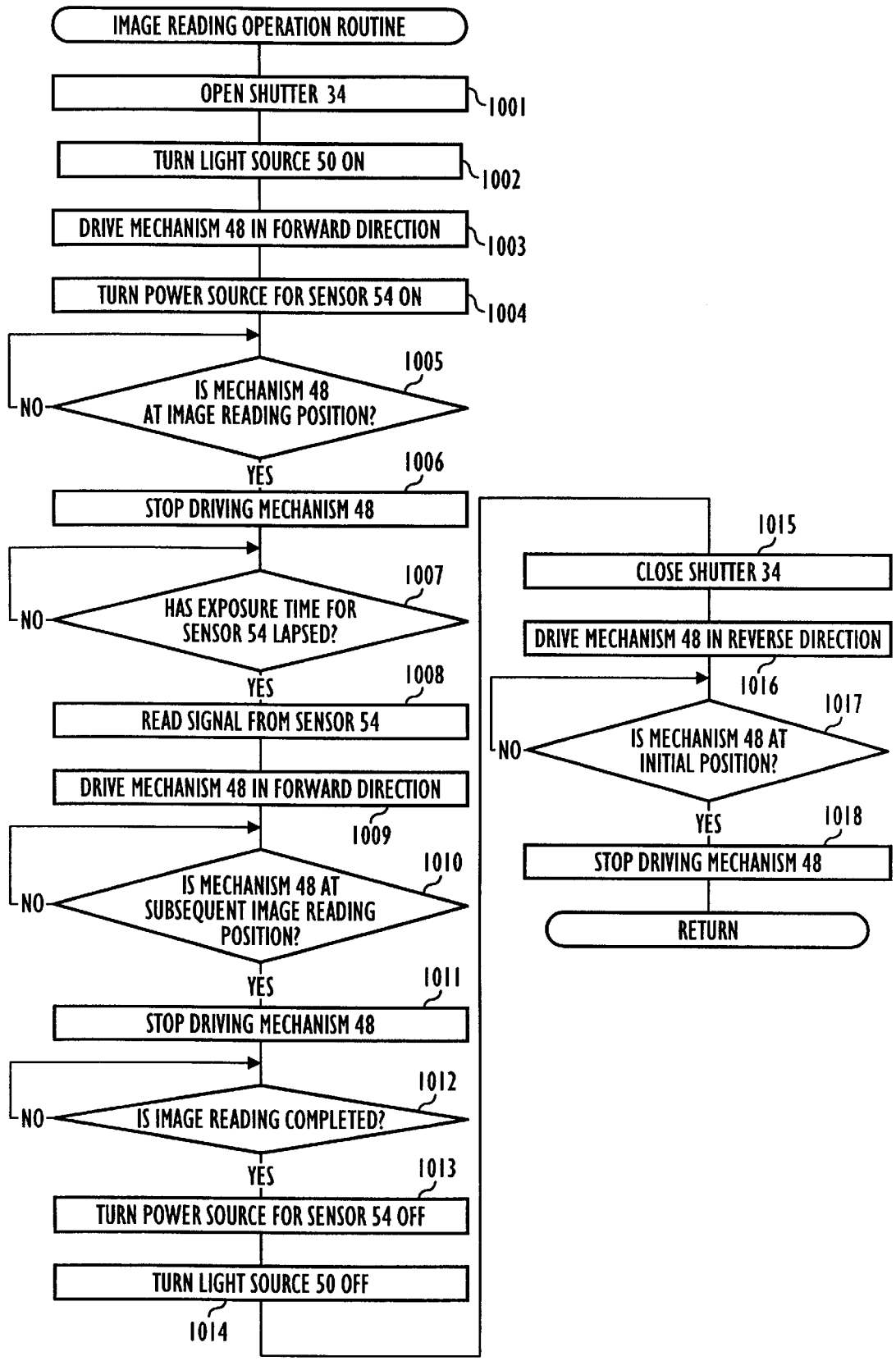
FIG. 10 is a flow chart showing an image reading operation routine which constitutes a part of the main routine shown in FIG. 6.
Figure 11:
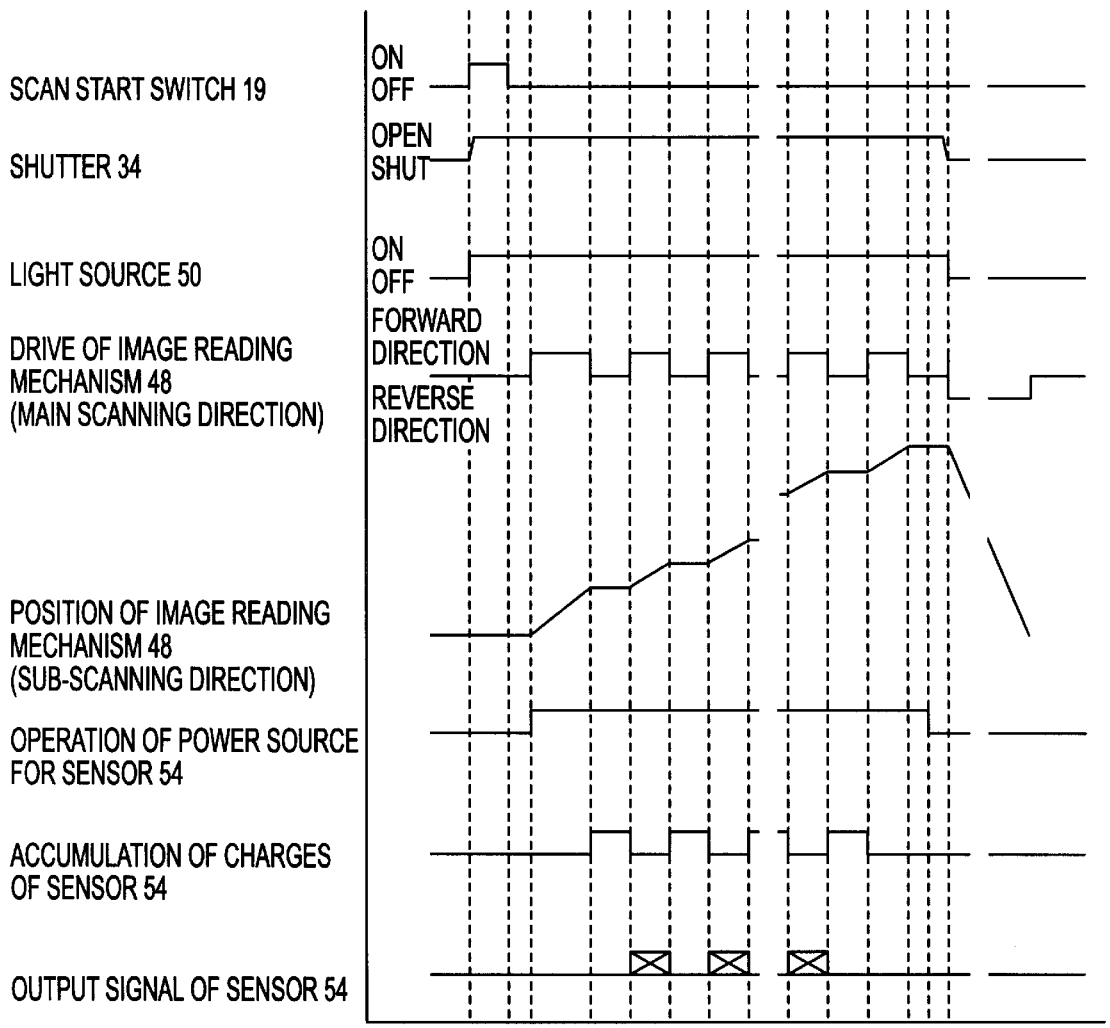
FIG. 11 is a time chart related to the image reading operation routine shown in FIG. 10.

FIG. 10 shows a routine of the image reading operations, carried out at step 610, and FIG. 11 shows a time chart of the image reading operations.

In FIG. 6, if the user actuates the scan start switch SSS 19 while the routine comprising steps 609 and 610 is being repeated, the ON signal is issued from the SSS 19 (FIG. 11). If the ON signal is issued from the SSS 19, control proceeds to step 1001 from step 610 to open the shutter 34. Thereafter, the light source 50 is turned ON at step 1002. At step 1003, the image reading mechanism 48 is driven in the forward direction. Note that the forward direction refers to a direction of movement in which the image reading mechanism 48 moves from the position indicated by the solid line to the position indicated by the dotted line in FIG. 2. The reverse direction refers to a direction of movement in which the image reading mechanism moves from the position indicated by the dotted line to the position indicated by the solid line. As mentioned above, in the image reading operation, the shutter 34 is opened to make the light emitted from the light source 50 incident upon the electronic development type recording medium RM, independent of the photographing operation.

At step 1005, whether or not the image reading mechanism 48 is at the reading position of the electronic development type recording medium RM is checked. Namely, whether or not the line sensor 54 of the image reading mechanism 48 is positioned at the horizontal scan commencement position, with respect to the image recording area of the electronic development type recording medium RM, is checked. If the line sensor 54 is positioned at the horizontal scan commencement position, control proceeds to step 1006 at which driving of the image reading mechanism 48 is stopped. A stepping motor or a servo motor, etc., which can be controlled by counting the number of drive pulses output from the scanner drive circuit, can be used as a drive source of the image reading mechanism 48.

At step 1007, whether or not the exposure time for the line sensor 54 has lapsed is checked, i.e. whether an optimum charge accumulation time for the image pickup device thereof has lapsed is checked (FIG. 11). If the exposure time has lapsed, control proceeds to step 1008 to read the image signals from the line sensor 54. Thereafter, the image signals are processed through the amplifier 62 and the A/D converter 64 and are then temporarily stored in the memory 68.

The image reading mechanism 48 is driven in the forward direction of the sub-scanning direction at step 1009, and thereafter, whether or not the image reading mechanism 48 has reached the subsequent reading position in the sub-scanning direction is checked at step 1010. Namely, whether or not the line sensor 54 of the image reading mechanism 48 has arrived at the subsequent scanning line, is checked. If the line sensor has reached the subsequent scanning line, control proceeds to step 1011 to stop the drive of the image reading mechanism 48. Thereafter, at step 1012, whether or not all the recorded images of the electronic development type recording medium RM have been read is checked. At this stage, if all the images have not been read, control is returned to step 1007 from step 1012.

In the illustrated embodiment, the number of scanning lines in the horizontal direction, for the recorded images of the electronic development type recording medium RM is 2,000, and accordingly, the routines, from step 1007 to step 1012, are repeated 2,000 times. As can be seen in FIG. 11, the image reading mechanism 48 is intermittently moved 2,000 times in the forward direction during the image reading operation, so that the image signals can be read from the line sensor 54 during the intermittent movement of the image reading mechanism 48.

If the reading operation of the recorded images of the electronic development type recording medium RM is completed, control proceeds from step 1012 to step 1013, at which the power source for the line sensor 54 is turned OFF. At step 1014, the light source 50 is also turned OFF. Thereafter, at step 1015, the shutter 34 is closed. After that, the image reading mechanism 48 is moved in the reverse direction (i.e., the direction from the position indicated by the dotted line toward the position indicated by the solid line in FIG. 2). Whether or not the image reading mechanism 48 reaches the initial position is checked at step 1017. If the image reading mechanism 48 has reached the initial position, control proceeds to step 1018 to stop the driving of the image reading mechanism 48. Thereafter, control is returned to step 601 in FIG. 6.

Figure 12:
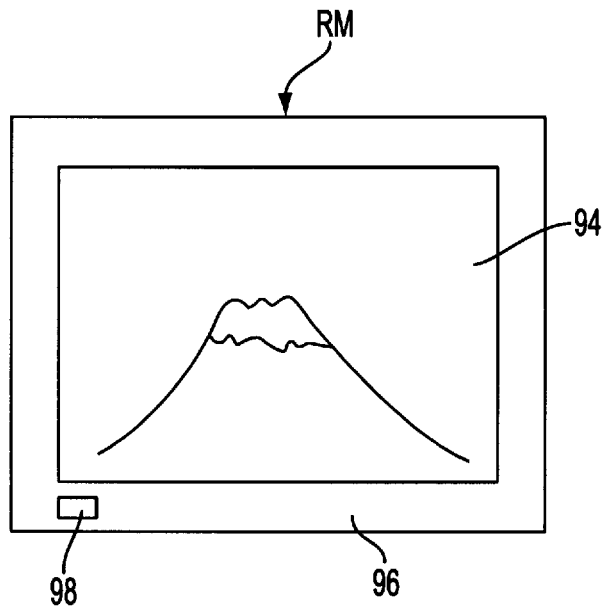
FIG. 12 is a front elevational view of an electronic development type recording medium for an electronic development type camera, according to a second embodiment of the present invention.
Figure 13:
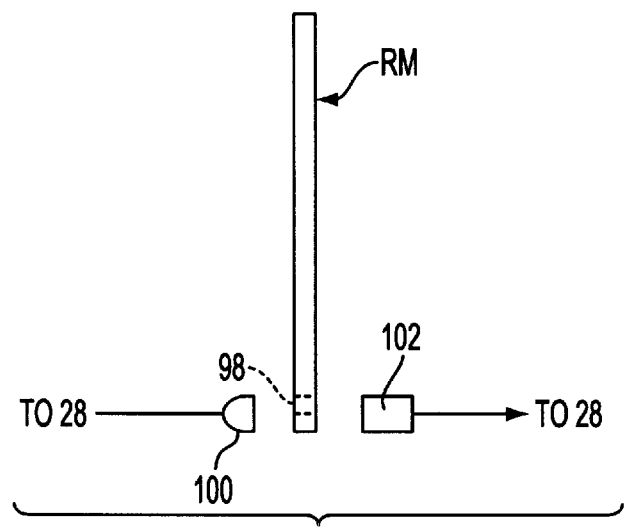
FIG. 13 is a side view of the electronic development type recording medium shown in FIG. 12, at a loaded position in which it is loaded in an electronic development type camera.

FIGS. 12 and 13 show a second embodiment of the electronic development type camera according to the present invention.

In the second embodiment, the electronic development type recording medium RM is provided at the peripheral margin 96 away from the image recording area 94 thereof, with a detecting portion 98, as shown in FIG. 12. Upon recording images in the recording area 94 of the electronic development type recording medium RM, the detecting portion 98 is also exposed by external light. Accordingly, the transmittance of the detecting portion 98 exhibits characteristics similar to the curve "A" shown in FIG. 4. Consequently, the transmittance of the detecting portion 98 of the electronic development type recording medium RM in which no images have been recorded on it, is at the minimum level ML shown in FIG. 4, but when images have been recorded on the electronic development type recording medium RM, the transmittance of the detecting portion 98 is considerably large.

In the second embodiment, a light source 100 and an optical sensor 102 are provided in the vicinity of the electronic development type recording medium RM, when the electronic development type recording medium RM is loaded in the camera body, so that the light source 100 and the optical sensor 102 are opposed to each other and are aligned with the portion to be detected 98, of the electronic development type recording medium RM, as shown in FIG. 13. The light source 100 and the optical sensor 102 are connected to the system controller 28.

Figure 14:
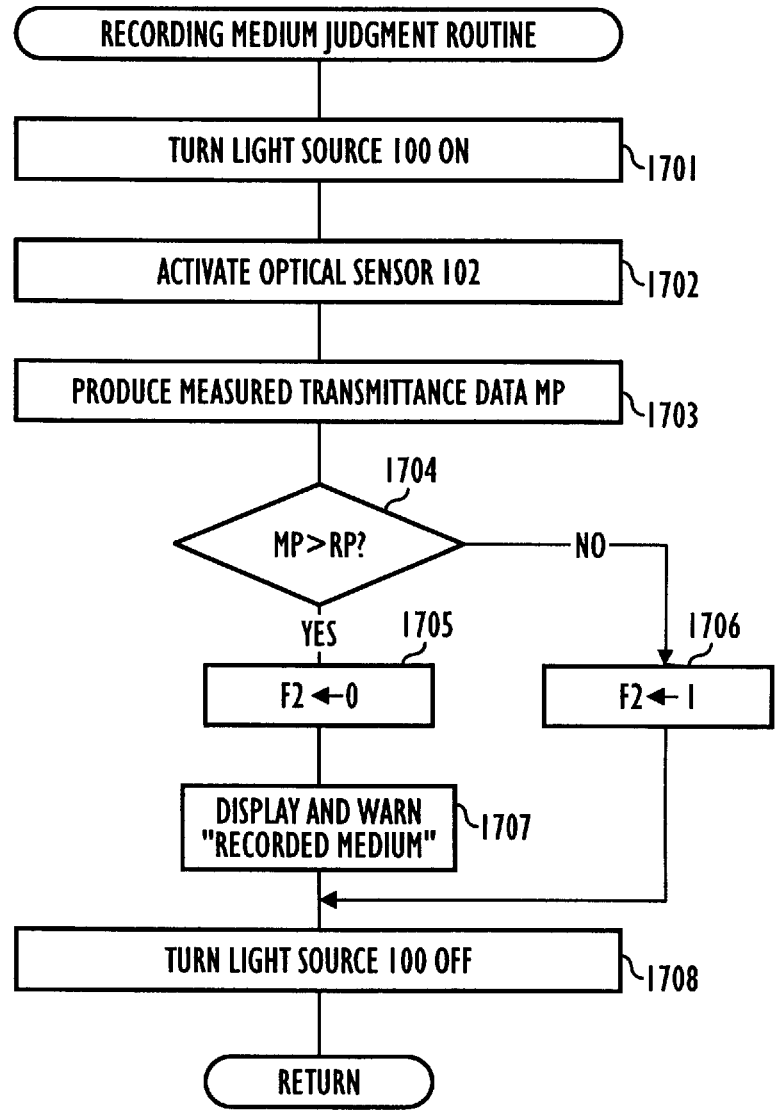
FIG. 14 is a flow chart showing a determination routine to judge whether or not data has been recorded on a recording medium, according to the second embodiment of the present invention.

Referring to FIG. 14 which shows a judgement routine to judge whether images have been recorded on the electronic development type recording medium RM, at step S602 in FIG. 6.

The light source 100 is turned ON at step 1701, and the optical sensor 102 is actuated at step 1702, so that output signals from the optical sensor are sent to the system controller 28. The light emitted from the light source 100 and transmitted through the detecting portion 98 of the electronic development type recording medium RM is received by the optical sensor 102. Consequently, the output signals of the optical sensor 102 contain transmittance data relating to the portion to be detected 98. At step 1703, measured transmittance data MP is calculated in accordance with the output signals of the optical sensor 102. Thereafter, the measured transmittance data MP is compared with the reference transmittance data RP at step 1704. The reference transmittance data RP is selected, for example, to be identical to the level ML shown in FIG. 4. If the detected electronic development type recording medium RM has no images recorded on it, the measurement data MP is substantially identical to the minimum level (reference transmittance data) ML. Conversely, if the detected electronic development type recording medium RM has images recorded on it, the measurement data MP is considerably larger than the reference transmittance data RP (ML).

If the measurement data MP is larger than the reference data RP at step 1704, i.e. the detected electronic development type recording medium RM has images recorded on it, control proceeds to step 1705 where the judgement flag F2 is set "0". In the case where the judgement flag F2 is "0", the system controller 28 prohibits an image to be recorded on the recording medium RM, even if the controller 28 detects that the release button 16 is depressed. Thereafter, control proceeds to step 1707 to indicate on the liquid crystal display panel 22 a mark, symbol, message or the like illustrating that the recording medium RM has been already exposed. Thereafter the light source 100 is turned OFF at step 1708. Thereafter, control is returned to step 603 (FIG. 6). Conversely, if the measurement data MP is not greater than the level RP at step 1704, namely, the detected electronic development type recording medium RM has no images recorded on it, control proceeds to step 1706 where the judgement flag F2 is set "1". Thereafter the light source 100 is turned OFF at step 1708, and control is returned to step 603 (FIG. 6).

Figure 15:
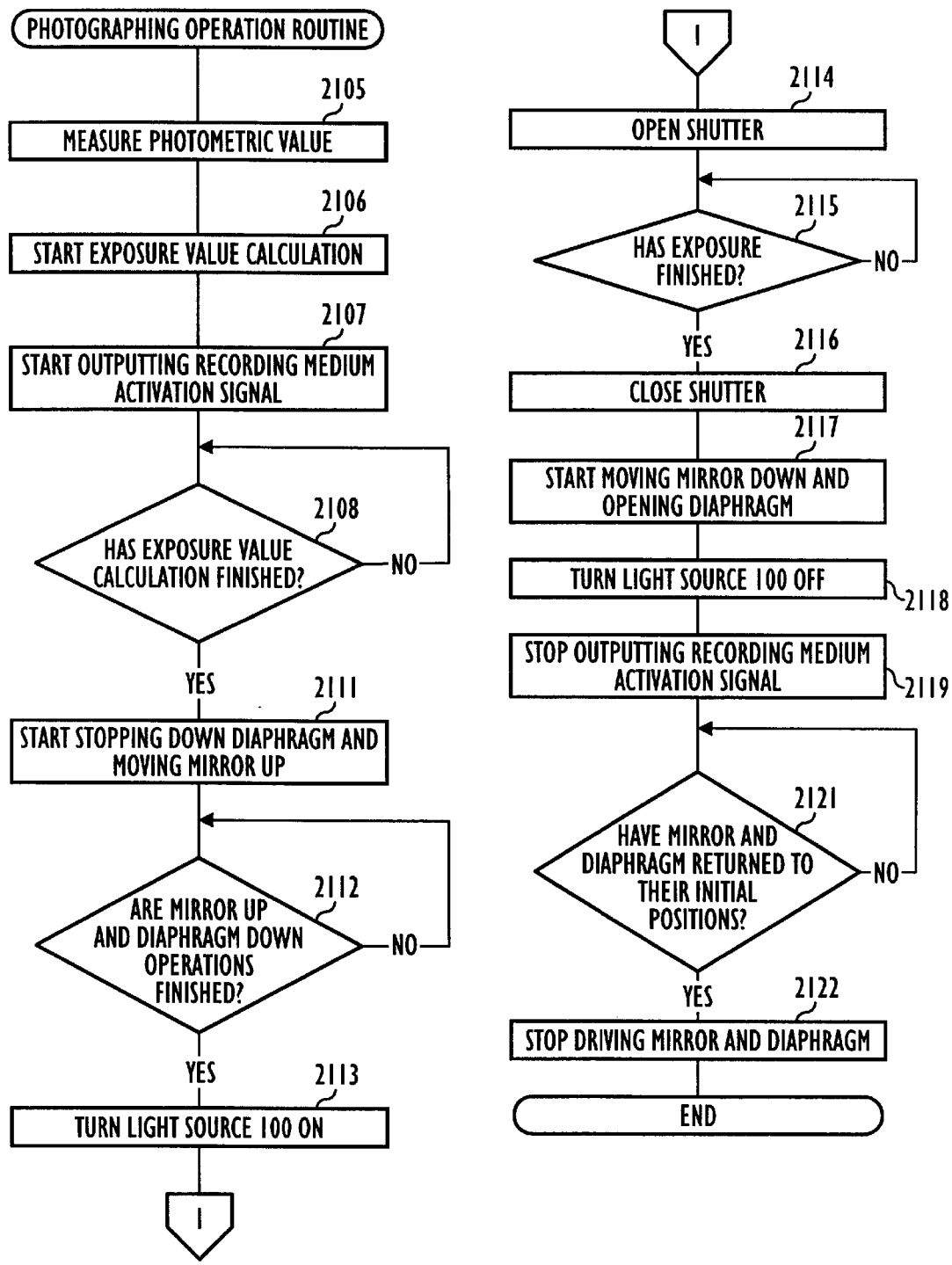
FIG. 15 is a flow chart showing a photographing operation routine according to the second embodiment of the present invention.

FIG. 15 is a flow chart illustrating a photographing operation routine in the second embodiment of the electronic development type camera.

In the photographing operation routine of FIG. 15, firstly, the signal outputted from the photometering sensor 18, i.e. a photometric value, is measured at step 2105. At step 2106, in accordance with the measured photometric value, an exposure value calculation is commenced. Thereafter, recording medium activation signals start to be outputted at step 2107, which turns the power source 33 ON, so that a voltage is applied to the electrostatic data recording medium 78 and the charge holding medium 80. Thereafter, it is checked if the exposure value calculation is finished or not at step 2108. At step 2108, in the case of the calculation having been completed, control proceeds to step 2111.

At step 2111, the diaphragm 30 is stopped down from its fully-open position to a predetermined open position having specific opening angles while the quick-return mirror 32 is moved up to its upper-end open position from its initial lower-end closed position. At step 2112, in the case where it is checked that the mirror 32 has moved up to its upper-end open position and the diaphragm 30 has also stopped down to the predetermined open position, control proceeds to step 2113 to turn the light source 100 ON, thereby the detecting portion 98 of the recording medium RM is exposed. Thereafter, the shutter 34 is released at step 2114. Thereafter, when it is checked that an exposure is completed at step 2115 after the exposure time calculated by the exposure calculation has elapsed, control proceeds to step 2116 to close the shutter 34. Upon the shutter 34 being completely closed, control proceeds to step 2117 to move the mirror 32 back down to its initial closed position and to fully open the diaphragm 30. Thereafter, control proceeds to step 2118 to turn the light source 100 OFF, and subsequently, proceeds to step 2119 to stop outputting the recording medium activation signals.

The recording medium activation signals continue to be outputted at least during the time the shutter 34 is opened so that a predetermined voltage is applied to the recording medium RM while the shutter 34 is open. Given an exposure in this state, a visible subject image is formed on the recording medium RM. This visible image is maintained even if the recording medium activation signals stop to be outputted.

At step 2121, when it is checked that both the mirror 32 and the diaphragm 30 have returned to their initial positions, control proceeds to step 2122 to stop driving the mirror 32 and the diaphragm 30, and then the routine ends.

As can be seen from the foregoing, according to the second embodiment of the present invention, it can be checked if the recording medium RM has been already exposed with the recording medium RM loaded in the camera. The result of this is indicated on the liquid crystal display panel 22, which prevents the recording medium RM from being exposed more than one time by mistake.

Figure 16:
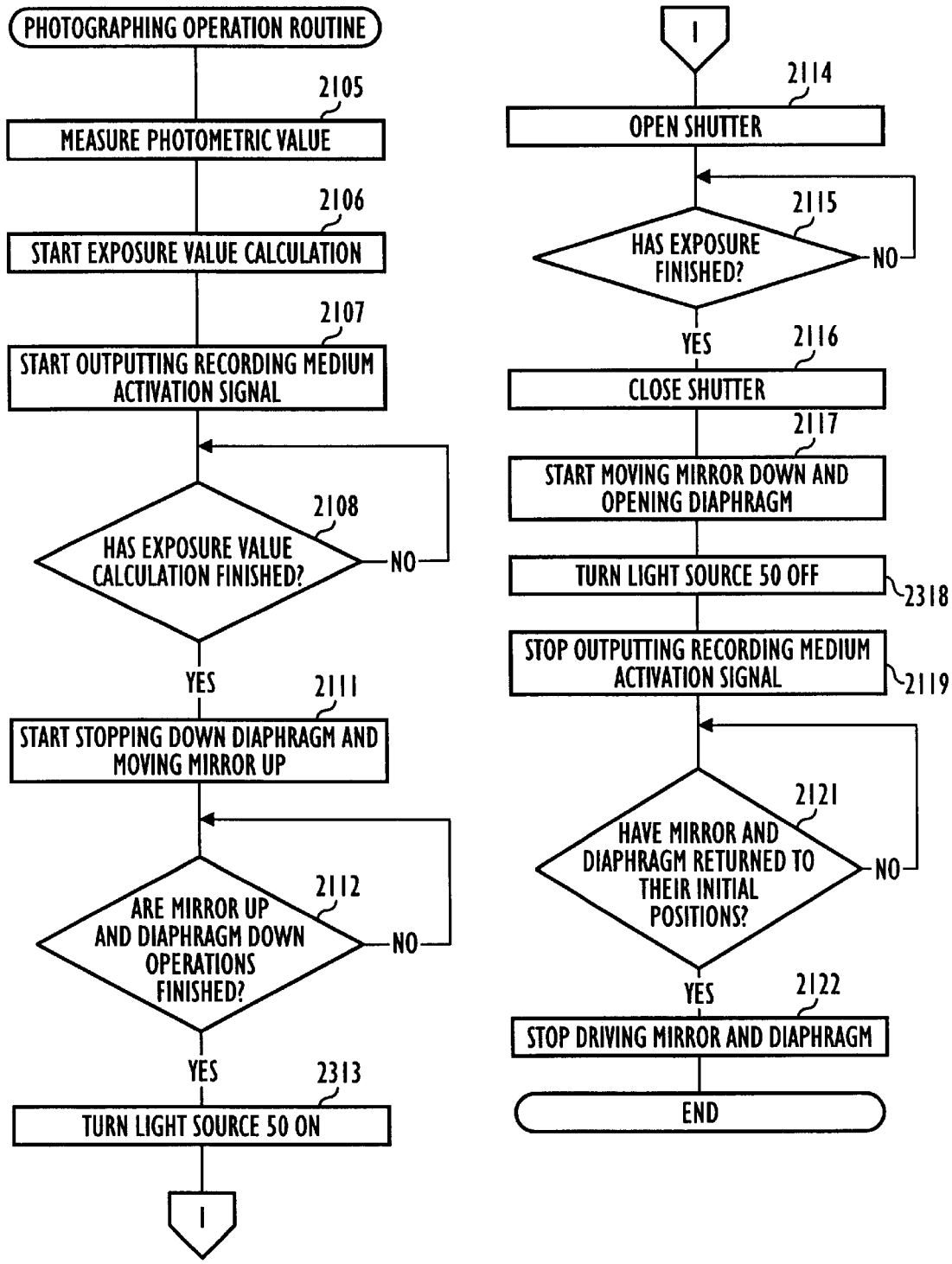
FIG. 16 is a flow chart showing a further photographing operation routine according to the third embodiment of the present invention; and, FIG. 17 is a flow chart showing a further determination routine to judge whether or not data has been recorded on a recording medium, according to the third embodiment of the present invention.
Figure 17:
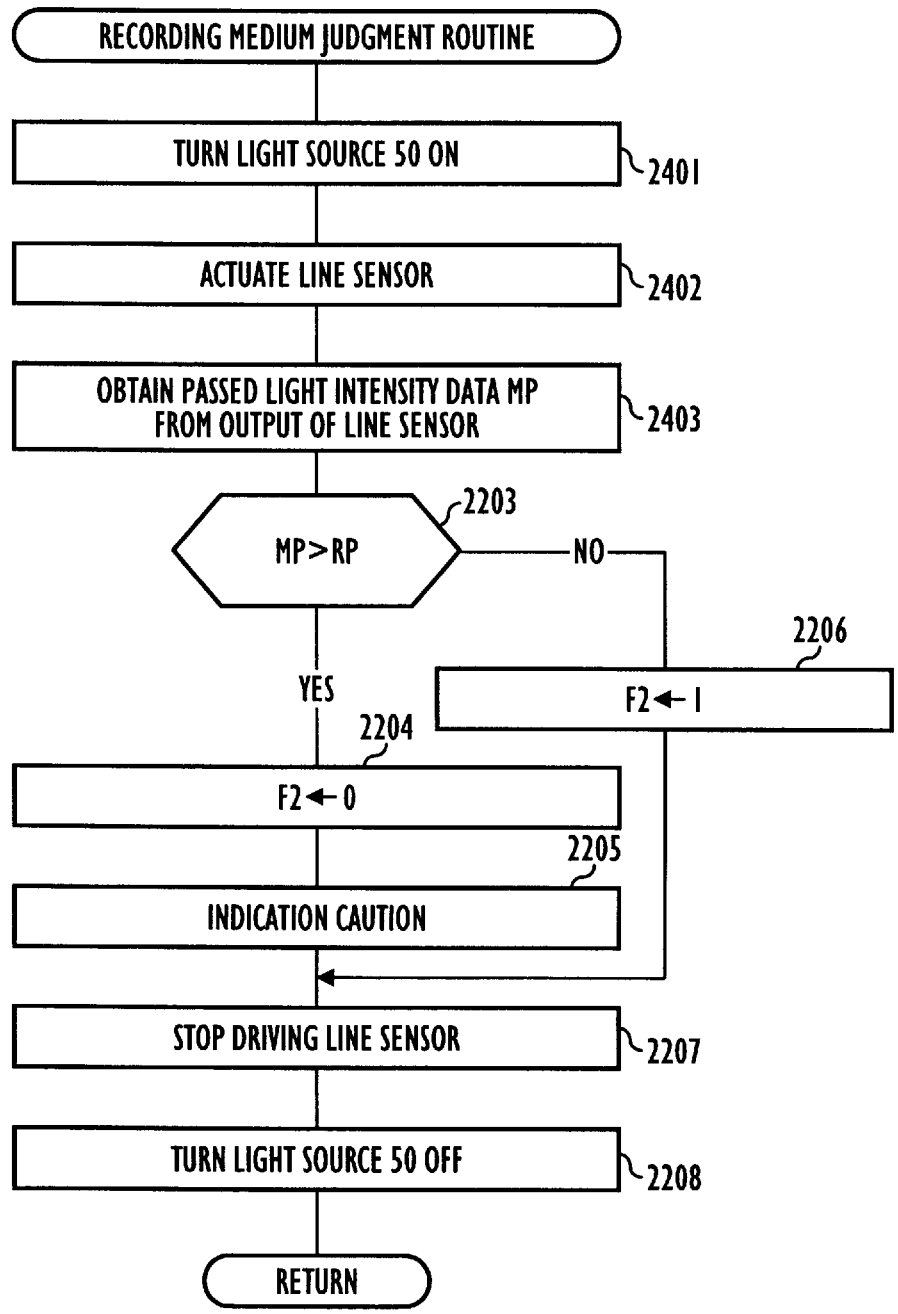

FIG. 16 is a flow chart illustrating a photographing operation routine in the third embodiment of the electronic development type camera. FIG. 17 is a flow chart illustrating a recording medium judgement routine in the third embodiment which judges whether the electronic development type recording medium RM has been already exposed or not. In this third embodiment, the light source 100 and the optical sensor 102 used in the second embodiment are not provided.

In the third embodiment, the detecting portion 98 of the recording medium RM is exposed by light emitted from the light source 50 when the recording medium RM is exposed. That is, the detecting portion 98 is exposed by light emitted from the light source 50, which is mainly used for applying light to the recording medium RM when an image developed by the recording medium RM is read by the line sensor 54. Namely, in the third embodiment, the light source 50 has a function similar to the light source 100 of the second embodiment.

In FIG. 16, steps similar to those shown in the photographing operation routine of FIG. 15 are designated by the same numerals.

Only those steps of FIG. 16 different from those of FIG. 15 will be explained hereinbelow. After it is checked that the mirror 32 has moved up to its upper-end open position and the diaphragm 30 has also stopped down to the predetermined open position at step 2112, control proceeds to step 2313 to turn the light source 50 ON, thereby the detecting portion 98 of the recording medium RM is exposed. After the the mirror 32 has moved down to its initial closed position and the diaphragm 30 has fully opened at step 2117, control proceeds to step 2318 to turn the light source 50 OFF, and subsequently, proceeds to step 2119.

On the other hand, in the recording medium judgement routine of FIG. 17, firstly, the light source 50 is turned ON at step 2401 to emit light to the detecting portion 98 of the recording medium RM. Thereafter, at step 2402, the power supply of the line sensor 54 is turned ON so as to actuate the line sensor 54 and the line sensor drive circuit 60 starts operating. At this time, the line sensor 54 is placed at a position corresponding to the detecting portion 98 of the recording medium RM, and image signals detected by the line sensor 54 from the detecting portion 98 are amplified through the amplifier 62 and converted to digital image signals through the A/D converter 64. The digital image signals are inputted to the system controller 28 after a predetermined treatment is applied to the digital image signals. That is, at step 2403, the intensity data MP of the light passed through the detecting portion 98 is measured and obtained in accordance with the signals outputted from the line sensor 54.

After step 2403, control proceeds to step 2203 to check if the measured intensity data MP is larger than the reference data RP. When it is judged that the measured intensity of the passed light is larger than a predetermined reference intensity at step 2203, since it means that the recording medium RM has been already exposed, control proceeds to step 2204 where the judgement flag F2 is set "0" so as not to record any image on the exposed recording medium RM. In the case where the judgement flag F2 is "0" the system controller 28 prohibits an image to be recorded on the recording medium RM, even if the controller 28 detects that the release button 16 is depressed. After step 2204 control proceeds to step 2205 to indicate on the liquid crystal display panel 22 a mark, symbol, message or the like illustrating that the recording medium RM has been already exposed. After this indication control proceeds to step 2207 to stop driving the line sensor 54, and subsequently, proceeds to step 2208 to turn the light source 50 OFF. Thereafter, control is returned to step 602 (shown in FIG. 6).

On the other hand, at step 2203, when it is judged that the measured intensity MP of the passed light is smaller than the predetermined reference intensity RP, since it means that the recording medium RM has not been exposed, control proceeds to step 2206 where the judgement flag F2 is set "1" so as to allow an image to be recorded on the recording medium RM. Thereafter, control proceeds to step 2207.

As can be seen from the foregoing, according to the third embodiment of the present invention, an effect similar to that of the second embodiment can be obtained without providing such members as the light source 100 and the optical sensor 102, for detecting the state of recording of the recording medium RM, thus the entire system is simpler than that of the second embodiment.

In a modification to the second embodiment, it is possible to use the image reading mechanism 48 in order to measure the transmittance of the detecting portion 98 of the electronic development type recording medium RM. In this modification, light is emitted from the light source 50 toward the detecting portion 98, and the light transmitted therethrough is received by the line sensor 54 through the scanning optical system 52. Consequently, the measured transmission data MP can be obtained in accordance with the total quantity of electric charges accumulated in the line sensor. In this modification, neither the additional light source 100, nor the additional optical sensor 102 are necessary.

In the present invention, the method to judge the electronic development type recording medium is not limited to that in the illustrated embodiments mentioned above. For example, it is possible for a user to put or write a mark or symbol on the electronic development type recording medium RM after the images have been recorded therein. Whether the electronic development type recording medium has images recorded on it or not, can be judged by detecting the mark or symbol applied to the electronic development type recording medium RM. In other judgement methods, it is possible to provide a removable or breakable tab on the electronic development type recording medium RM, similar to those provided in conventional magnetic tape cassettes to protect from rewriting or re-recording.

Although the release switch 16 and the scan start switch 19 are separately provided in the illustrated embodiments, it is possible to provide a single switch which serves as a release switch and a scan start switch. Namely, the single switch is selectively used as a release switch or a scan start switch, in accordance with detection signals which represent whether images have or have not been recorded on the electronic development type recording medium to be detected.

Having thus described the invention, what is claimed is:

1. An electronic development type camera using an electronic development type recording medium comprised of an electrostatic data recording medium and an electric charge holding medium, said camera comprising:

a holder which detachably holds the electrical development type recording medium;

a sensor that detects that the electronic development type recording medium is being held by the holder; and a system that judges whether or not an image has been recorded on the electronic development type recording medium when the recording medium is held by the holder;

said electrostatic data recording medium including a detecting area and a recording area, and said judging system comprising:

a system that detects a transmittance of the detecting area;

a system that evaluates whether or not the detected transmittance is substantially identical to a predetermined reference value; and a system that indicates that an image has been recorded on the electronic development type recording medium when the detected transmittance is not substantially identical to said predetermined reference value.

2. The electronic development type camera according to claim 1, wherein said evaluating system comprises a calculating system that calculates a difference between the transmittance detected by the detecting system and the predetermined reference value, and a system that compares an absolute value of the difference obtained by the calculating system with a predetermined error value.

3. The electronic development type camera according to claim 1, wherein said indicating system comprises an optical signaling system.

4. The electronic development type camera according to claim 1, wherein said indicating system comprises an acoustic signaling system.

5. The electronic development type camera according to claim 1, further comprising a light emitter which emits light toward the detecting area during photographing.

6. The electronic development type camera according to claim 1, wherein said electronic development type recording medium comprises a medium on which a visible image is formed, upon photographing, without a need for chemical treatment after exposure.

7. The electronic development type camera according to claim 1, further comprising a system that prohibits a photographing operation when the judging system judges that an image has been recorded on the recording medium.

8. The electronic development type camera according to claim 1, wherein said detecting system comprises a light transmission type photo sensor which is provided with a light emitter and a light receiver located at opposite sides of the recording medium, respectively.

9. An electronic development type camera utilizing an electronic development type recording medium, said camera comprising:
- a holder which removably holds the electronic development type recording medium;
- a sensor that detects a presence of the electronic development type recording medium, when the electronic development type recording medium is held within said holder; and
- a determining system which determines whether or not an image has been recorded on the electronic development type recording medium held by said holder;
- said electronic development type recording medium includes a detecting area;
- said determining system comprising a mechanism that detects a transmittance of said detecting area;
- a system that evaluates whether or not the detected transmittance is substantially identical to a predetermined transmittance reference value; and
- a system that indicates that an image has been recorded on the electronic development type recording medium when the detected transmittance is not substantially identical to the predetermined transmittance reference value.

10. The camera according to claim 9, said evaluation system comprising a calculation mechanism that calculates a difference between the transmittance detected by said determining system and said predetermined transmittance reference value, and a comparison mechanism which compares an absolute value of the difference obtained by the calculation mechanism with a predetermined error value.

11. The camera according to claim 9, said indicating system comprising an optical signaling mechanism.

12. The camera according to claim 9, said indicating system comprising an acoustic signaling mechanism.

13. The camera according to claim 9, further comprising a light emitter which emits light towards said detecting area when a photographing operation is performed.

14. The camera according to claim 9, wherein the electronic development type recording medium comprises a medium on which a visible image is formed during a photographing operation without requiring chemical treatment after exposure.

15. The camera according to claim 9, further comprising a mechanism for prohibiting a photographing operation when the determining system determines that an image has been recorded on the recording medium.

16. The camera according to claim 9, said electronic development type recording medium comprising an electrostatic data recording medium and an electric charge holding medium.

17. The camera according to claim 9, said determining system comprising a light transmission type photosensor which is provided with a light emitter and a light receiver positioned at opposite sides of the recording medium.

18. An electronic development type camera using an electronic development type recording medium comprising an electrostatic data recording medium and an electric charge holding medium, said camera comprising:
- a holder which detachably holds the electronic development type recording medium;
- a sensing means for detecting that the electronic development type recording medium is being held by said holder; and
- judging means for judging whether or not an image has been recorded on the electronic development type recording medium when the recording medium is held by said holder;
- said electronic data recording medium including a detecting area and a recording area, said judging means comprising:
  - means for detecting a transmittance of the detecting area;
  - means for evaluating whether or not the detected transmittance is substantially identical to a predetermined reference value; and
  - means for indicating that an image has been recorded on the electronic development type recording medium when the detected transmittance is not substantially identical to said predetermined reference value.

* * * * *